United States Patent
Parks

(10) Patent No.: US 10,492,478 B1
(45) Date of Patent: Dec. 3, 2019

(54) WEEDLESS FISHING LURE JIG WITH OFFSET BAIT

(71) Applicant: Steve Parks, Burleson, TX (US)

(72) Inventor: Steve Parks, Burleson, TX (US)

(*) Notice: Subject to any disclaimer, the term of this patent is extended or adjusted under 35 U.S.C. 154(b) by 0 days.

(21) Appl. No.: 15/291,753

(22) Filed: Oct. 12, 2016

Related U.S. Application Data

(60) Provisional application No. 62/240,946, filed on Oct. 13, 2015.

(51) Int. Cl.
  *A01K 85/02* (2006.01)
  *A01K 85/00* (2006.01)
  *A01K 83/06* (2006.01)

(52) U.S. Cl.
  CPC .............. *A01K 85/02* (2013.01); *A01K 83/06* (2013.01); *A01K 85/00* (2013.01)

(58) Field of Classification Search
  CPC ........ A01K 83/02; A01K 85/00; A01K 85/02; A01K 97/06; A01K 83/06
  USPC ... 43/42.37, 42.38, 42.41, 43.16, 43.2, 43.4, 43/44.2, 44.8
  See application file for complete search history.

(56) References Cited

U.S. PATENT DOCUMENTS

| | | | | |
|---|---|---|---|---|
| 1,538,909 A | * | 5/1925 | Shannon | A01K 85/00 43/42.25 |
| 1,644,151 A | * | 10/1927 | Rodgers | A01K 85/16 43/42.24 |
| 2,195,347 A | * | 3/1940 | Wiard | A01K 83/00 43/43.6 |
| 2,745,208 A | * | 5/1956 | Zech | A01K 83/06 43/44.8 |
| 3,750,321 A | * | 8/1973 | McClellan | A01K 85/00 43/42.1 |
| 3,831,307 A | * | 8/1974 | Pittman | A01K 85/01 43/42.24 |
| 3,834,060 A | * | 9/1974 | Wagenknecht | A01K 83/06 43/44.8 |

(Continued)

OTHER PUBLICATIONS

Bass Pro Shops: The Best Hunting, Fishing, Camping & Outdoor Gear, "Buckeye Lures Spot Remover Jigheads", pp. 1-5, http://www.basspro.com/BuckeyeLuresSpotRemoverJigheads/product/78588.

(Continued)

*Primary Examiner* — Darren W Ark
*Assistant Examiner* — Brady W Frazier
(74) *Attorney, Agent, or Firm* — Geoffrey A. Mantooth; Brian K. Yost

(57) ABSTRACT

A fishing lure has a jig, a skirt and a bait. The jig has a jig head, with a hook extending from the jig head. A skirt anchor extends from the jig head toward the point of the hook point along an imaginary line, so as to be offset from the shank of the hook. A skirt is coupled to the skirt anchor. A bait keeper is pivotally coupled to the skirt anchor. The flexible bait is rigged in a weedless configuration, with one end of the bait coupled to the bait keeper and the other end receiving the hook point. The skirt is coupled to the skirt anchor so that the skirt streamers extend adjacent to the bait when the lure is retrieved in water. When a fish bites the lure, the first end portion of the bait body flexes away from the imaginary line for engaging the hook point into the fish to allow the hook to more easily penetrate into the fish.

8 Claims, 3 Drawing Sheets

(56) References Cited

U.S. PATENT DOCUMENTS

| | | | | |
|---|---|---|---|---|
| 4,023,301 A * | 5/1977 | Warner | A01K 85/08 | 43/42.25 |
| 4,219,956 A * | 9/1980 | Hedman | A01K 85/00 | 43/42.1 |
| 4,244,133 A * | 1/1981 | Martinek | A01K 85/00 | 43/42.25 |
| 4,334,381 A * | 6/1982 | Carver | A01K 85/00 | 43/42.29 |
| 4,367,607 A * | 1/1983 | Hedman | A01K 85/00 | 43/42.1 |
| 4,777,758 A * | 10/1988 | Phillips | A01K 85/00 | 43/42.09 |
| 4,873,783 A * | 10/1989 | McGahee | A01K 85/00 | 43/42.24 |
| 4,899,483 A * | 2/1990 | Pipped | A01K 83/00 | 43/42.39 |
| 4,926,579 A * | 5/1990 | Jimenez | A01K 85/00 | 43/42.44 |
| 5,220,743 A * | 6/1993 | McClellan | A01K 83/06 | 43/42.37 |
| 5,230,178 A * | 7/1993 | Dillard | A01K 83/06 | 43/42.31 |
| 5,231,786 A * | 8/1993 | Hughes | A01K 85/00 | 43/42.39 |
| 5,237,772 A * | 8/1993 | Gibbs | A01K 83/00 | 43/43.16 |
| 5,261,182 A * | 11/1993 | Link | A01K 85/00 | 43/42.28 |
| 5,274,946 A * | 1/1994 | Fusco | A01K 85/02 | 43/43.2 |
| 5,335,443 A * | 8/1994 | Grigsby, Jr. | A01K 85/00 | 43/43.14 |
| 5,339,559 A * | 8/1994 | Strobbe | A01K 85/00 | 43/42.28 |
| 5,551,185 A * | 9/1996 | Reed | A01K 85/00 | 43/42.31 |
| 5,649,384 A * | 7/1997 | Manning | A01K 85/00 | 43/42.37 |
| 5,784,827 A * | 7/1998 | Jimenez, Jr. | A01K 85/00 | 43/44.8 |
| 5,890,317 A * | 4/1999 | Hollomon | A01K 85/00 | 43/42.31 |
| 5,899,015 A * | 5/1999 | Link | A01K 85/00 | 43/42.28 |
| 5,904,001 A * | 5/1999 | Rabideau | A01K 85/00 | 43/44.2 |
| 6,122,857 A * | 9/2000 | Rhoten | A01K 85/00 | 43/42.37 |
| 6,240,672 B1 * | 6/2001 | Huppert | A01K 83/06 | 43/42.37 |
| D474,523 S * | 5/2003 | Renosky | D22/126 | |
| 6,601,336 B1 * | 8/2003 | Link | A01K 85/00 | 43/42.11 |
| 6,836,996 B1 * | 1/2005 | Huppert | A01K 85/00 | 43/42.39 |
| 8,869,446 B2 * | 10/2014 | Parks | A01K 85/02 | 43/42.28 |
| 2006/0037232 A1 * | 2/2006 | Gill | A01K 83/06 | 43/42.39 |
| 2009/0199456 A1 * | 8/2009 | Lutyens | A01K 83/00 | 43/43.2 |

OTHER PUBLICATIONS

Siebert Outdoors: "Shot Caller Swim Jighead," pp. 1-2, http://www.siebertoutdoors.com/Shot-Caller-Swim-Jighead-1017.htm.

Siebert Outdoors: "EnRAGED Series Jigs", pp. 1-2, http://www.sieberoutdoors.com/EnRAGED-Series-Jigs-1020.htm.

Obsessed With Fishing: "Top 6 Shakey Heads", pp. 1-8, http://obsessedwithfishing.com/top-6-shakey-heads.

* cited by examiner

WEEDLESS FISHING LURE JIG WITH OFFSET BAIT

FIELD OF THE INVENTION

The present invention relates to fishing lures, and in particular to weedless lures.

BACKGROUND OF THE INVENTION

Fishing with artificial lures is convenient and productive for the angler. Live bait must be kept alive and replenished frequently from a bait shop or other source. Artificial lures do not require the same care. Many artificial lures are attractive to fish when fished with skill and are productive in catching fish.

One type of lure includes a jig head. The jig head provides both a hook and a weight. The weight allows the lure to be cast out some distance and provides control of depth of the lure on retrieval.

Many species of fish can be found in weedy environments. A lure is cast out and retrieved through the underwater weeds. If the hook is exposed, the hook will gather weeds and lose its attractiveness to a fish. The lure becomes fouled with weeds. Also, the lure easily snags on weeds and cannot be retrieved. A snagged lure may have to be cut off and left in the water. Therefore, it is preferable to use a lure that is rigged in a weedless configuration, wherein the lure is unlikely to gather weeds or become snagged on weeds.

There are a number of ways to rig a lure in a weedless configuration. For example, with a soft plastic lure or bait, the hook point is embedded in the plastic. The hook is not exposed and will not snag on weeds. As another example, a brush guard may be used. A brush guard includes stiff bristles that are positioned in front of the hook point. However, some anglers think a brush guard detracts from the attractiveness of the lure to fish.

Some anglers desire to rig a lure with a skirt to provide movement in addition to the lure. As the skirted lure is retrieved through the water, the streamers of the skirt move relative to the remainder of the lure. Such movement catches the attention of fish. Providing an attractive lure with a jig head, a weedless bait and a skirt has proven difficult.

DESCRIPTION OF THE PREFERRED EMBODIMENT

The present invention provides a fishing lure 11 (see FIG. 3) with a jig head, a bait and a skirt, all of which are rigged to fish weedless. As a result, a highly attractive lure is presented to the fish in a weedy environment. As the lure is retrieved, it will not snag on weeds or other underwater structure. The skirt provides motion in addition to the movement of the lure through the water. The bait is rigged to give way and allow the hook to penetrate the fish, resulting in a higher percentage of successful hook sets.

Figure 1:
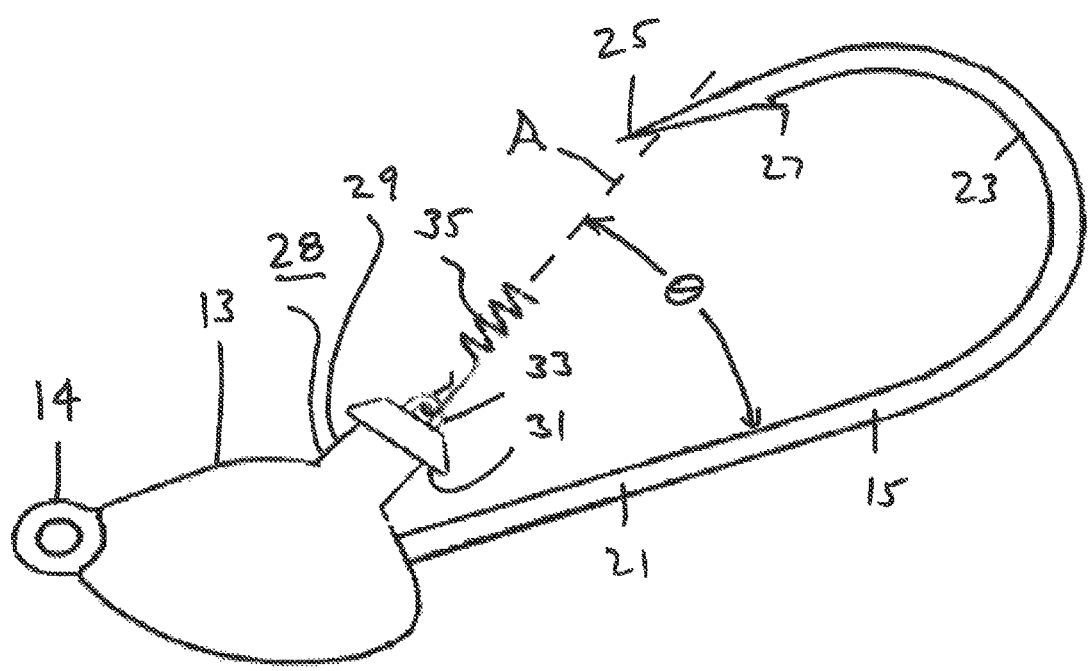
FIG. 1 is a side view of the jig head of the present invention, in accordance with a preferred embodiment.

FIG. 1 shows a jig head and hook arrangement. The jig head 13 is typically made of metal such as lead or steel and has a front eye 14 for attachment to the fishing line. Opposite the eye is the rear end, where the hook 15 extends from. The hook has a shank 21, a bend 23 and a point 25. Near the point 25 is a barb 27. The shank 21 and the bend 23 lie in a plane. For most hooks, the point 25 will lie in the same plane.

The jig head is also equipped with a skirt anchor or collar 28. The skirt anchor is a cylindrical protuberance 29 extending from the jig head toward the point 25 of the hook. The skirt anchor need not be cylindrical and may be some other shape, such as oval, etc. On the outer end of the protuberance is a circumferential barb or ridge 31 and a central eye 33. A helical wire, or spring, bait keeper 35 is attached to the central eye 33. The bait keeper 35 can pivot about the central eye 33. The skirt anchor 28 lies in the same plane as the hook 15. The skirt anchor has an imaginary longitudinal axis A. The axis A is offset from the shank 21 of the hook by an angle θ. In the preferred embodiment, the axis A extends to the point 25 portion of the hook. The axis A need not intersect the point 25 precisely, but need only be adjacent to the point portion of the hook. The offset angle θ can be varied. A larger size hook will have a larger bend 23, which creates a larger gap between the point 25 and the shank 21, wherein the angle θ will be larger than for a smaller sized hook. Also, for example, the bait may have some curvature that would benefit from a different angle θ. Although a helical wire bait keeper 35 is described herein, the bait can be retained to the skirt anchor 28 by other keeper devices or means. For example, the bait keeper can be a length of wire having a sufficient stiffness to allow insertion into the wire into the bait. The wire can be straight or curved. Alternatively, the bait keeper can be a barbed peg. The bait keepers are pivotally coupled to the skirt anchor.

Figure 2:
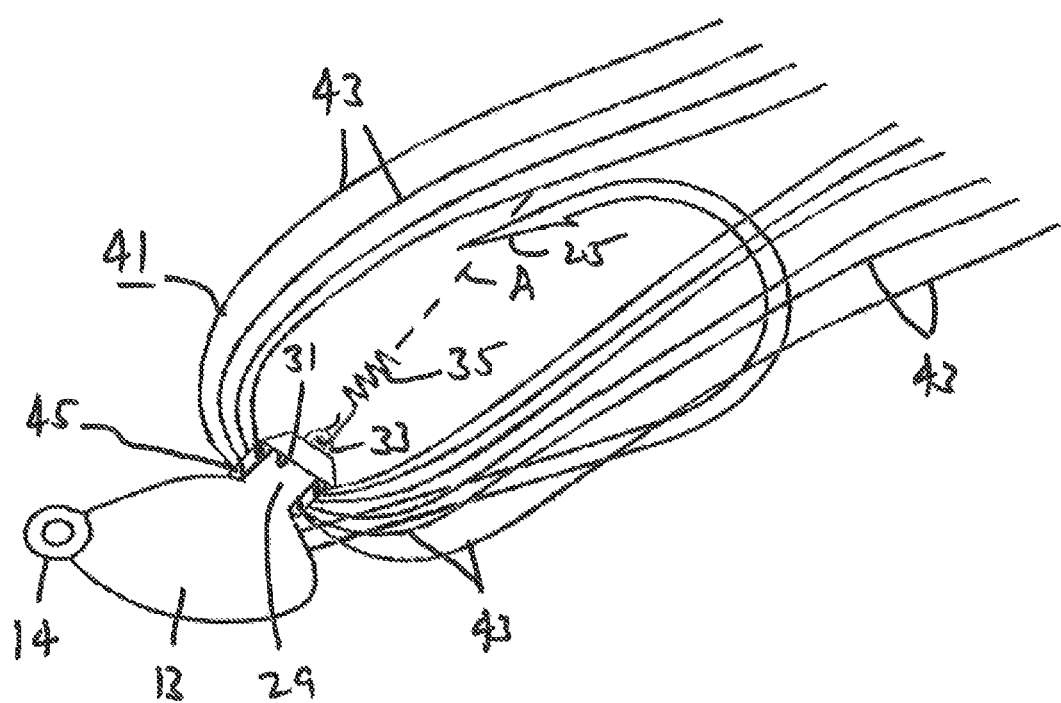
FIG. 2 is a side view of the jig head of FIG. 1, with a skirt.

To rig the lure, a skirt 41 is attached to the skirt anchor 28 (see FIG. 2). The skirt has streamers 43 and a rubber band 45 (shown in cross-section in FIGS. 2 and 3). The streamers 43 are flexible plastic or rubber strips of some length (usually several inches). Both the streamers 43 and the band 45 are conventional and commercially available. The streamers come in various colors so that a fisherman can choose the color of the streamers used on the lure. The streamers 43 are laid adjacent to the imaginary line A, with their center portions adjacent to the skirt anchor protuberance (in FIGS. 2 and 3, the streamers are shown cross-wise, not aligned with, the line A so as to better show the skirt anchor; anglers are very familiar with how to attach skirts to lures). The rubber band 45 is located around the protuberance 29 and the center portions of the streamers so as to secure the streamers thereto. The band 45 is kept in place on the protuberance by the circumferential barb 31. The size of the skirt anchor protuberance 29 is large enough to securely hold the streamers in place by way of the band 45. Typical dimensions of the skirt anchor protuberance 29 are 0.140-0.200 inches in diameter. Of course, the diameter of the barb 31 is larger. As an alternative, the diameter of the skirt anchor protuberance 29 is sized larger than the diameter of the hook shank 21. Hooks are made of wire and the wire gauge of the shank 21 and bend 23 are typically matched to the size of the intended fishing line. Typically, the diameter of the skirt anchor protuberance 29 is twice as large as the diameter of the hook shank 21.

Figure 3:
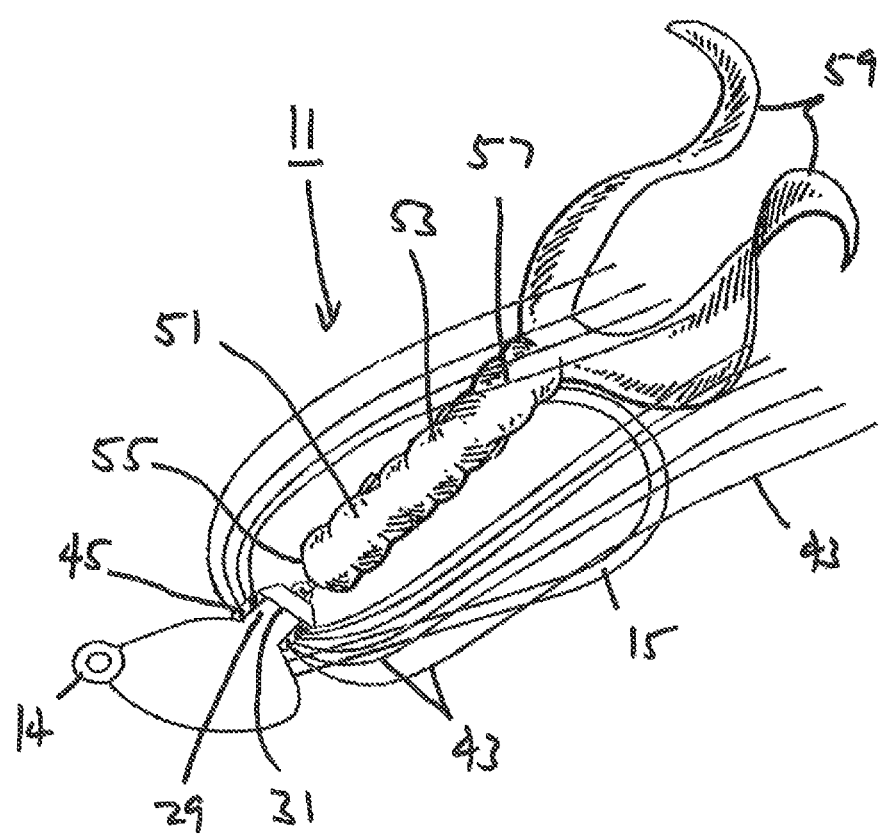
FIG. 3 is a side view of the lure, including the jig head of FIG. 2 with a bait.

The bait 51 is attached to the lure as shown in FIG. 3. The bait, which is typically made of plastic, is flexible and has some length to it. The bait is also elastomeric and allows some stretching of the bait. The bait 51 has a body 53 with a front end 55 and a rear end 57. The front end 55 is coupled to the bait keeper 35. To couple, the bait is turned or twisted onto the spiral bait keeper. The bait is then aligned with the point of the hook and the hook point 25 is embedded into the bait. Thus, the bait 51 is attached at the bait keeper 35 and at the hook point 25. By embedding the hook point 25 in the bait, the lure is rigged as weedless. That is, the point is not exposed and will not snag or gather weeds. The bait 51 may have one or more appendages or extensions 59 such as tails, arms or legs 59 (tails are shown in FIG. 3). The appendages can extend rearwardly beyond the hook point or laterally. The lure is now ready for fishing.

In use, the lure 11 is attached to line. The line is tied directly to the front eye 14, or coupled by other means such as by snaps. The angler casts the lure into a promising location in the water. If allowed to, the lure sinks due to the weight of the jig head. The angler retrieves the lure. Because the point of the hook 25 is covered by the bait 51, the lure will not snag the weeds. As a result, it moves cleanly through the weeds. The skirt streamers 43 move as the lure is retrieved and as the lure falls in the water toward the bottom. As the lure is retrieved, the streamers 43 move. The alignment of the skirt anchor 28 in line A with the weedless rigged bait 53 allows the streamers to center around the bait, and extend adjacent to the bait. In addition, the streamers extend along the hook shank, effectively concealing the hook. The rubber band 45 and barb 31 securely retain the skirt on the lure. Likewise, any appendages 59 on the bait also move. This movement of the skirt streamers 43 and bait appendages 59 provide action to the lure, which action is in addition to the movement of the lure in the water. Such action is attractive to fish. The depth of the lure is controlled by the speed of retrieve. A faster retrieve has the lure moving at shallow depths, even on the surface. A slow retrieve has the lure moving along the bottom.

When a fish hits the lure, the bait body 53 flexes under the pressure of the fish's mouth. The bait keeper 35 allows the front end of the bait body 53 to pivot away from the line or axis A. This pivoting opens or increases the gap around the point 25 of the hook so that the hook point can thus be set into the fish. Allowing the bait body to move during a fish strike results in a higher percentage of hook sets into the fish. Some prior art lure arrangements have baits that are rigidly positioned and that interfere with the setting of the hook in the fish.

Thus, the lure provides a skirted, weedless, jig head bait in a manner that increases hook sets into fish.

The foregoing disclosure and showings made in the drawings are merely illustrative of the principles of this invention and are not to be interpreted in a limiting sense.

The invention claimed is:

1. A weedless fishing lure, comprising:
   a) a jig comprising a jig head, the jig head having a front eye and a rear end, the jig comprising a hook, the hook having a shank coupled to the rear end of the jig head, the hook having a bend and a point, the jig head comprising a skirt anchor integral to and extending from the jig head toward the hook point along a skirt anchor longitudinal axis so that the skirt anchor longitudinal axis is angularly offset from the hook shank at a non-zero angle;
   b) a bait keeper pivotally coupled to the skirt anchor;
   c) a bait having a flexible body coupled to the bait keeper, the bait body having first and second end portions, the first end portion of the bait body coupled to the bait keeper, the bait body rigged weedless by embedding the hook point within the bait body;
   d) a skirt coupled to the skirt anchor, the skirt having streamers that extend adjacent to the bait when the lure is retrieved in water, wherein when a fish bits the lure, the first end portion of the bait body flexes away from the skirt anchor longitudinal axis for engaging the hook point into the fish.

2. The weedless fishing lure of claim 1, wherein the skirt anchor comprises a free end, an eye coupled to the free end of the skirt anchor, the bait keeper pivotally coupled to the eye.

3. The weedless fishing lure of claim 2, wherein the skirt anchor is substantially cylindrical and has a barb.

4. The weedless fishing lure of claim 2, wherein the bait keeper comprises a helical wire.

5. The weedless fishing lure of claim 1, wherein the bait comprises an appendage coupled to the body.

6. The weedless fishing lure of claim 1, wherein the bait body is elastomeric.

7. The weedless fishing lure of claim 1, wherein the hook shank has a first diameter and the skirt anchor has a second diameter, the second diameter being larger than the first diameter.

8. The weedless fishing lure of claim 1, wherein the bait keeper is embedded in the bait body first end portion.

* * * * *